US012733592B2

(12) United States Patent
Akita

(10) Patent No.: US 12,733,592 B2
(45) Date of Patent: Sep. 15, 2026

(54) ELECTRIC WORKING MACHINE WITH OPERATING ROD

(71) Applicant: YAMABIKO CORPORATION, Tokyo (JP)

(72) Inventor: Makoto Akita, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 127 days.

(21) Appl. No.: 18/751,471

(22) Filed: Jun. 24, 2024

(65) Prior Publication Data

US 2025/0000016 A1 Jan. 2, 2025

(30) Foreign Application Priority Data

Jun. 27, 2023 (JP) ................................ 2023-105288

(51) Int. Cl.

*A01G 3/053* (2006.01)
*A01D 34/00* (2006.01)
*A01D 34/10* (2006.01)
*A01D 34/37* (2006.01)
*A01D 34/84* (2006.01)
*A01D 34/90* (2006.01)

(52) U.S. Cl.

CPC ........... *A01G 3/053* (2013.01); *A01D 34/006* (2013.01); *A01D 34/10* (2013.01); *A01D 34/37* (2013.01); *A01D 34/84* (2013.01); *A01D 34/90* (2013.01)

(58) Field of Classification Search

CPC ...... A01D 34/006; A01D 34/90; A01G 3/062; A01G 3/085; A01G 3/053; A01G 3/0417; A01G 3/086

See application file for complete search history.

(56) References Cited

U.S. PATENT DOCUMENTS 5,261,162 A 11/1993 Siegler
9,955,627 B2 * 5/2018 Nakano .................. A01G 3/062
11,284,568 B2 * 3/2022 McCue .................. A01G 3/053

(Continued)

FOREIGN PATENT DOCUMENTS

DE 102020216563 A1 * 6/2022 ................ B25F 5/02
GB 2399269 A 9/2004

OTHER PUBLICATIONS

EESR cited in corresponding European Patent Appln. No. 24183487.8 dated Nov. 26, 2024.

*Primary Examiner* — Jennifer S Matthews
(74) *Attorney, Agent, or Firm* — BACON & THOMAS, PLLC

(57) ABSTRACT

An electric working machine with an operating rod includes an electric motor on the base end of the operating rod, a working device on the head end of the operating rod, and a power transmission shaft passing through the inside of the operating rod to transmit power from the electric motor to the working device. The working device includes a blade member and is pivotally supported on the head end of the operating rod to be able to take a storage posture. A detection switch on the head end of the operating rod detects the storage posture. A controller on the base end of the operating rod controls the operation of the electric motor. A lead wire in the operating rod transmits a detection signal from the detection switch to the controller. The controller prevents the electric motor from being driven when the detection switch detects the storage posture.

6 Claims, 6 Drawing Sheets

(56) References Cited

U.S. PATENT DOCUMENTS

| | | | | |
|---|---|---|---|---|
| 11,723,314 | B2 * | 8/2023 | Ito | A01G 3/086 30/211 |
| 2022/0161411 | A1 * | 5/2022 | Sugiura | B25F 5/02 |

* cited by examiner

ELECTRIC WORKING MACHINE WITH OPERATING ROD

CROSS-REFERENCE TO RELATED APPLICATIONS

The present application claims priority from Japanese Patent Application No. 2023-105288 filed on Jun. 27, 2023, and the entire contents of which are hereby incorporated by reference.

BACKGROUND

1. Technical Field

The present invention relates to an electric working machine with an operating rod.

2. Related Art

A working machine, such as a brush cutter and a hedge trimmer, includes a single-axis operating rod. This operating rod has a working device with a cutting blade on the head end. This operating rod also has an operating device such as an operating handle on the base end. In recent years, electric working machines with operating rods have become popular because they are quiet and have less vibration compared with engine-driven ones.

Conventionally, an electric motor-driven working machine with an operating rod (electric working machine with an operating rod) has a heavy battery on the base end of the operating rod, or a worker wears a battery at the waist using a battery holster or a battery belt; an electric motor that drives a working device is provided on the head end of the operating rod. Also, an electric supply line passes through the inside of the operating rod. This electric supply line connects the electric motor to the battery. See, Japanese Patent Application Laid-Open 2016-202122. The entire contents of this disclosure are hereby incorporated by reference.

SUMMARY

The present invention provides an electric working machine with an operating rod including an electric motor provided on the base end of the operating rod, a working device provided on the head end of the operating rod, and a power transmission shaft passing through the inside of the operating rod. This power transmission shaft is configured to transmit power from the electric motor to the working device. The working device includes a blade member. This blade member is pivotally supported on the head end of the operating rod to be able to take a storage posture in which the blade member folds along the operating rod. A detection switch is provided on the head end of the operating rod to detect the storage posture. A controller is provided on the base end of the operating rod to control the operation of the electric motor. A lead wire is provided in the operating rod to transmit a detection signal from the detection switch to the controller. The controller is configured to prevent the electric motor from being driven when the detection switch detects the storage posture of the working device.

DETAILED DESCRIPTION

The head end of the operating rod is heavy due to the electric motor in the conventional electric working machine with an operating rod described above. The heaviness of the operating rod's head end could cause a problem. For example, a load on a worker's hands and arms increases when he keeps moving the working device right and left gripping the operating rod during mowing work. To address this problem, installing an electric motor as well as a battery on the base end of the operating rod, passing a power transmission shaft through the inside of the operating rod, and transmitting power from the electric motor to a working device provided on the head end of the operating rod via the power transmission shaft are conceivable.

The approach described above, however, makes it difficult to implement safety measures to stop the electric motor by electrical detection. When the electric motor is installed on the base end of the operating rod, electric components of the electric working machine with an operating rod gather on the base end of the operating rod. Therefore, it becomes difficult to implement the safety measures by electrical detection and stop the electric motor.

The present invention is proposed to address these problems. Therefore, the object of the invention is to make it easy to implement safety measures by electrically detecting the posture of the working device in an electric working machine with an operating rod. This electric working machine is configured to transmit power from an electric motor provided on the base end of the operating rod to the working device provided on the head end of the operating rod via a power transmission shaft that passes through the inside of the operating rod.

Hereinafter, an embodiment of the present invention will be described with reference to the drawings. The same reference numbers in the different drawings indicate the same functional parts, and therefore repeated description for each of the drawings is omitted.

Figure 1:
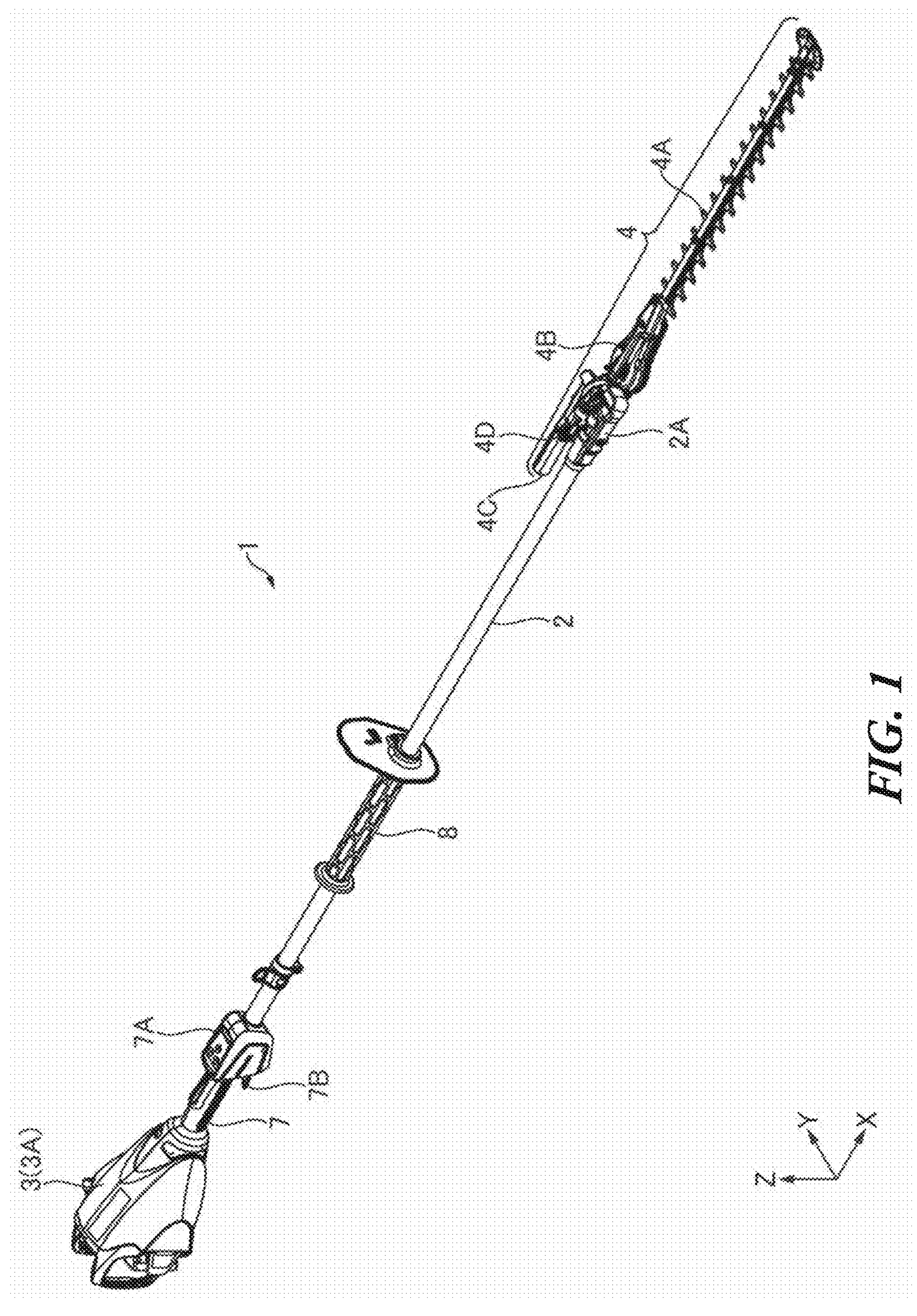
FIG. 1 is an overall view for illustrating an electric working machine with an operating rod in a working posture according to an embodiment of the invention.
Figure 2:
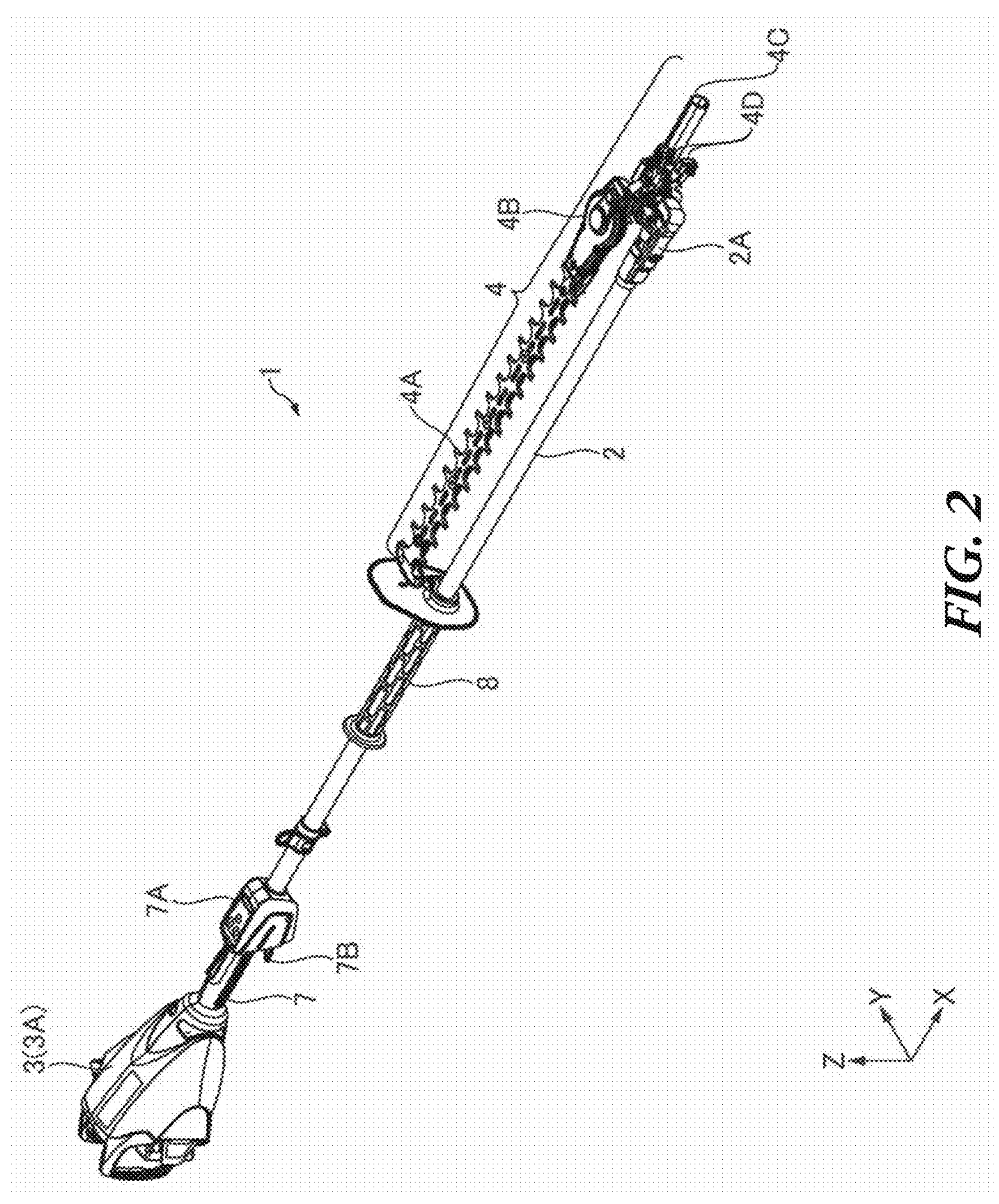
FIG. 2 is an overall view for illustrating the electric working machine with an operating rod in a storage posture according to an embodiment of the invention.

As illustrated in FIG. 1 and FIG. 2, an electric working machine with an operating rod (hereinafter referred to as "working machine") 1 includes an operating rod 2, a power device 3 provided on the base end of the operating rod 2, and a working device 4 provided on the head end of the operating rod 2. In the drawings, X-axis with an arrow indicates the longitudinal direction of the operating rod 2. Y-axis with an arrow and Z-axis with an arrow indicate two directions which are orthogonal to the X-axis and orthogonal to one another.

The operating rod 2 is a hollow tubular member extending in one axial direction (the X-axis direction in the drawings).

A rear handle 7 and a front handle 8 are provided on the outer circumference of the operating rod 2. The rear handle 7 is provided on the base end of the operating rod 2 and gripped by one hand of a worker. An operation panel 7A and an operating lever 7B are provided near the rear handle 7; they operate the start and the stop of the power device 3.

The front handle 8 is provided in the intermediate position of the operating rod 2 and gripped by the other hand of the worker. The front handle 8 may include an operation mechanism to operate the start and the stop of the power device 3 and a detection switch 13 for safety measures (see an example illustrated in FIG. 6); the detection switch 13 will be described later. The position of the front handle 8 is set to make it easy for the worker to grip the front handle 8 by one hand while the worker grips the rear handle 7 by the other hand. Therefore, the front handle 8 is provided close to the head end of the operating rod 2 when the operating rod 2 is short.

Figure 3:
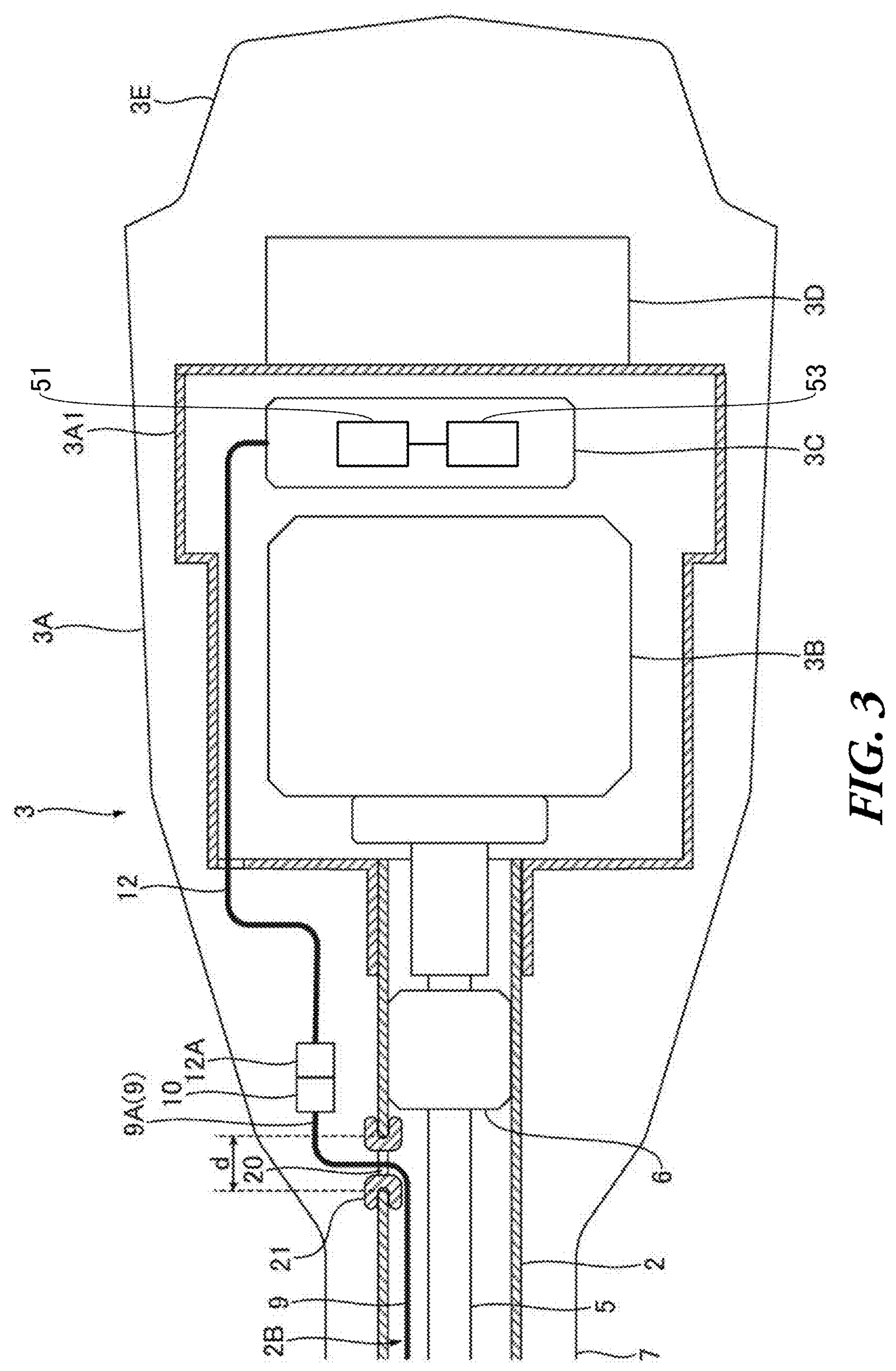
FIG. 3 is a schematic view for illustrating the configuration of a power device of the electric working machine with an operating rod according to an embodiment of the invention.

FIG. 3 is a schematic view for illustrating the configuration of the power device 3. The power device 3 includes a power case 3A on the base end of the operating rod 2. The power case 3A contains an inner housing 3A1 inside. The base end of the operating rod 2 is fixed to the inner housing 3A1. An electric motor 3B and a controller 3C are provided in the inner housing 3A1. In addition, a battery 3D for electric supply is provided on the outside of the inner housing 3A1: the battery 3D is replaceable. The electric motor 3B, the controller 3C, and the battery 3D are connected to each other by wires (not shown). Output signals from the controller 3C control the electric motor 3B. The battery 3D supplies electric power to the electric motor 3B and the controller 3C. The controller 3C includes a CPU (central processing unit; processor) 51 and a memory 53. The CPU 51 reads operation programs to perform various processing stored in the memory 53 and carries out various controls.

The working device 4 is pivotally supported on the head end of the operating rod 2. The working device 4 can be rotated around the Y-axis illustrated in the drawings with respect to the head end of the operating rod 2, between a working posture illustrated in FIG. 1 and a storage posture illustrated in FIG. 2. With the illustrated example, the working device 4 includes a blade member 4A for mowing work. The blade member 4A is disposed along the extension of the operating rod 2, or it is disposed along a line at a preset angle with respect to the longitudinal direction of the operating rod 2 in the working posture illustrated in FIG. 1. Meanwhile, the blade member 4A is rotated to fold along the operating rod 2 in the storage posture illustrated in FIG. 2. The head end of the blade member 4A faces the base end of the operating rod 2. In addition, the blade member 4A is in the storage posture when it is folded within a present angle range: the blade member 4A is not driven within this range.

The power transmission system of the working machine 1 will be described. The power transmission shaft 5 passes through the inside of the operating rod 2 along one axial direction as illustrated in FIG. 3. The power transmission shaft 5 is pivotally supported by a plurality of shaft support members 6: the shaft support members 6 are provided in the operating rod 2. The power device 3 includes the electric motor 3B. The electric motor 3B is the driving source of the working machine 1. Power from the electric motor 3B is transmitted to the working device 4 via the power transmission shaft 5. The electric motor 3B is connected to the power transmission shaft 5 by connecting the output shaft of the electric motor 3B directly to the base end of the power transmission shaft 5.

Figure 4:
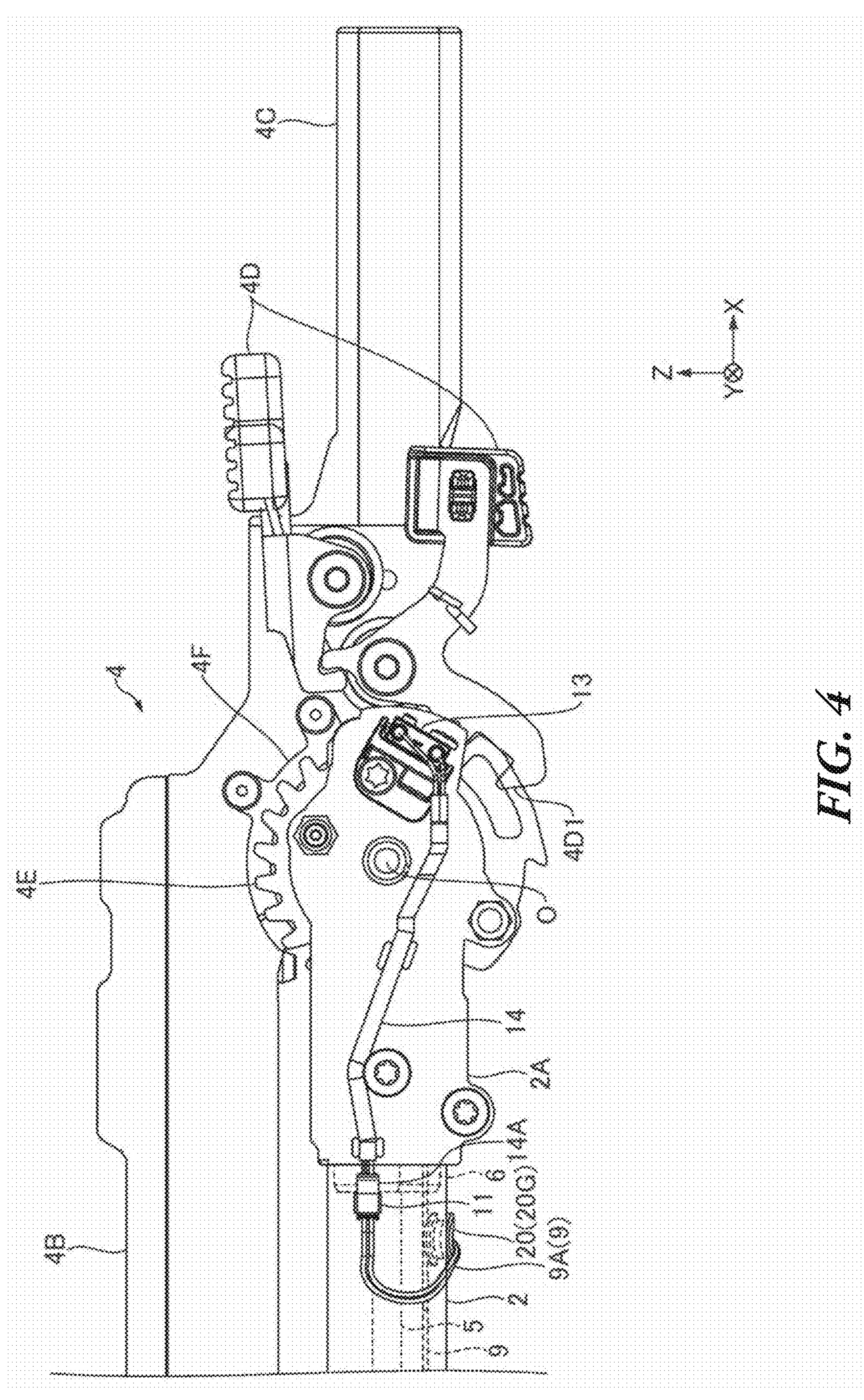
FIG. 4 is a view for illustrating the structure of the head end of the operating rod without a cover member according to an embodiment of the invention.

The head end of the power transmission shaft 5 is connected to an input gear in a fixed gearcase 2A, which is provided on the head end of the operating rod 2, as illustrated in FIG. 4. Meanwhile, an output gear in the fixed gearcase 2A is connected to an input gear in a movable gearcase 4B of the working device 4. The movable gearcase 4B includes a power transmission mechanism. This power transmission mechanism converts the rotation of the input gear into reciprocating motion, and the reciprocating blade of the blade member 4A is driven by this reciprocating motion.

A lead wire 9 is laid in the operating rod 2 along the longitudinal direction of the power transmission shaft 5. For laying the lead wire 9, the operating rod 2 includes a wiring space 2B around the power transmission shaft 5. The wiring space 2B is formed passing the plurality of shaft support members 6. The wiring space 2B is configured to prevent the rotation of the power transmission shaft 5 from interfering with the lead wire 9 in the operating rod 2. For example, bundling the lead wires 9 with a protection tube when there are a plurality of lead wires 9, aligning straight the space between the shaft support members 6 and the inner surface of the operating rod 2, and passing the lead wires 9 through this space.

The lead wire 9 has a connecting terminal 10 on one end and a connecting terminal 11 on the other end. For pulling these connecting terminals out from the operating rod 2, the operating rod 2 has a plurality of pull-out holes 20. Thus, the connecting terminal 10 is connected to a connecting terminal 12A of a wire 12 in the power case 3A of the power device 3 as illustrated in FIG. 3: the wire 12 connects the connecting terminal 12A to the controller 3C. Meanwhile, the connecting terminal 1 is connected to a connecting terminal 14A of a wire 14 as illustrated in FIG. 4: the wire 14 connects the connecting terminal 14A to a detection switch 13 provided on the head end of the operating rod 2.

The pull-out holes 20 are provided connecting with the wiring space 2B as illustrated in FIG. 3 and FIG. 4. The pull-out holes 20 may be provided in any positions near the electric components required to connect to the lead wire 9. For example, a pull-out hole 20 is provided in the intermediate position of the operating rod 2 when a detection switch is provided on the front handle 8 attached at the intermediate position of the operating rod 2; the lead wire 9 is pulled out from this hole.

The lead wire 9 is smoothly laid in the operating rod 2 by adjusting the sizes of its connecting terminals 10 and 11 and the inner diameters d of the pull-out holes 20. The inner diameters d of the pull-out holes 20 are larger than the connecting terminals 10 and 11 so that these terminals can go through the pull-out holes 20. With the example illustrated in FIG. 4, a grommet 20G, which protects the lead wire 9, is attached to the pull-out hole 20. In this case, the connecting terminals 10 and 11 are smaller than the inner diameter d of the pull-out hole 20 without the grommet 20G. Thus, the sizes of connecting terminals 10 and 11 and the inner diameters d of the pull-out holes 20 are adjusted to smoothly lay the lead wire 9 in the operating rod 2.

The lead wire 9 pulled out from the operating rod 2 through the pull-out holes 20 (pulled-out lead wire 9A) is covered with cover members. These cover members prevent the lead wire 9 from being exposed to the outside. For example, the power case 3A and the rear handle 7 serve as the cover members and cover the pulled-out lead wire 9A on the base end of the operating rod 2.

Figure 5:
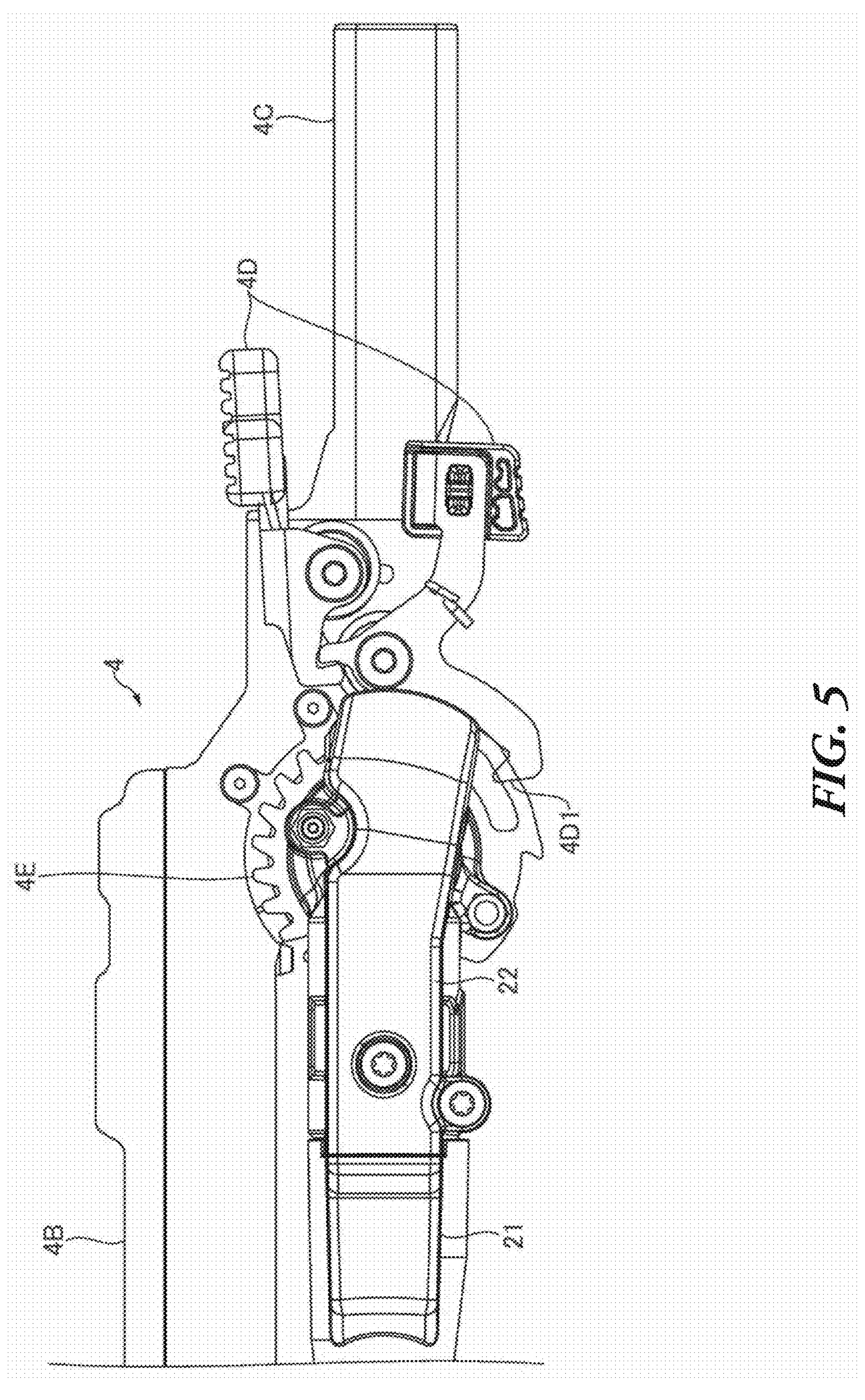
FIG. 5 is a view for illustrating the structure of the head end of the operating rod with cover members according to an embodiment of the invention.

Meanwhile, a cover member 21 covers the pulled-out lead wire 9A on the head end of the operating rod 2 as illustrated in FIG. 5. In addition, a cover member 22 covers the connecting terminal 11, the connecting terminal 14A, the wire 14, and the detection switch 13.

The working device 4 includes a posture change handle 4C integrated with the movable gearcase 4B. A worker can rotate the whole working device 4 around a shaft O (see FIG. 4) to change its posture by operating the posture change handle 4C while operating an unlocking lever 4D. For example, the worker can change the angle of the blade member 4A's longitudinal direction within a preset angle range along the extension of the operating rod 2 when the working device 4 is in the working posture as illustrated in FIG. 1. The posture of the working device 4 is fixed by engaging the engaging claw 4D1 of the unlocking lever 4D with a predetermined position of an engaged claw 4E: the engaged claw 4E is provided around the shaft O.

The detection switch 13 is disposed outside the fixed gearcase 2A on the head end of the operating rod 2. The detection switch 13 detects the posture of the working device 4. With the illustrated example, the detection switch 13 detects the storage posture of the working device 4 and transmits a detection signal to the controller 3C via the lead wire 9. When the detection switch 13 detects the storage posture of the working device 4, the controller 3C transmits a control signal to prevent the electric motor 3B from being driven. The detection switch 13 is attached to the head end of the operating rod 2 on the fixed side. Therefore, the lead wire 9 (pulled-out lead wire 9A) connected to the detection switch 13 does not affect the rotation of the working device 4 when the working device 4 is rotated to change its posture.

The working device 4 includes a switch operating mechanism. This switch operating mechanism operates the detection switch 13. With the example illustrated in FIG. 4, the switch operating mechanism is configured to operate the detection switch 13 when the working device 4 is rotated around the shaft O and folded within the preset angle range. A member rotating together with the working device 4 or a part of the working device 4 operates the detection switch 13. To be more specific, the working device 4 includes an operating member 4F, and the operating member 4F is configured to rotate around the shaft O together with the movable gearcase 4B. The operating member 4F operates the detection switch 13 directly or via a movable member. Thus, the operating member 4F and a mechanism to rotate the operating member 4F together with the movable gearcase 4B constitute the switch operating mechanism.

The combination of the detection switch 13 and the switch operating mechanism is not limited to the example described above. Various types of switches or sensors may be adopted as the detection switch 13. Examples of the detection switch 13 include a switch that transmits detection signals by a mechanical operation such as microswitch, a sensor that magnetically detects changes in the posture of the working device 4 without contact such as a proximity sensor, and a rotary position sensor or a rotary variable resistor that detects changes in the posture of the working device 4 via changes in electrical resistance. In addition, the working device 4 may include various switch operating mechanisms to operate the various t types of switches or sensors when the working device 4 is rotated.

Figure 6:
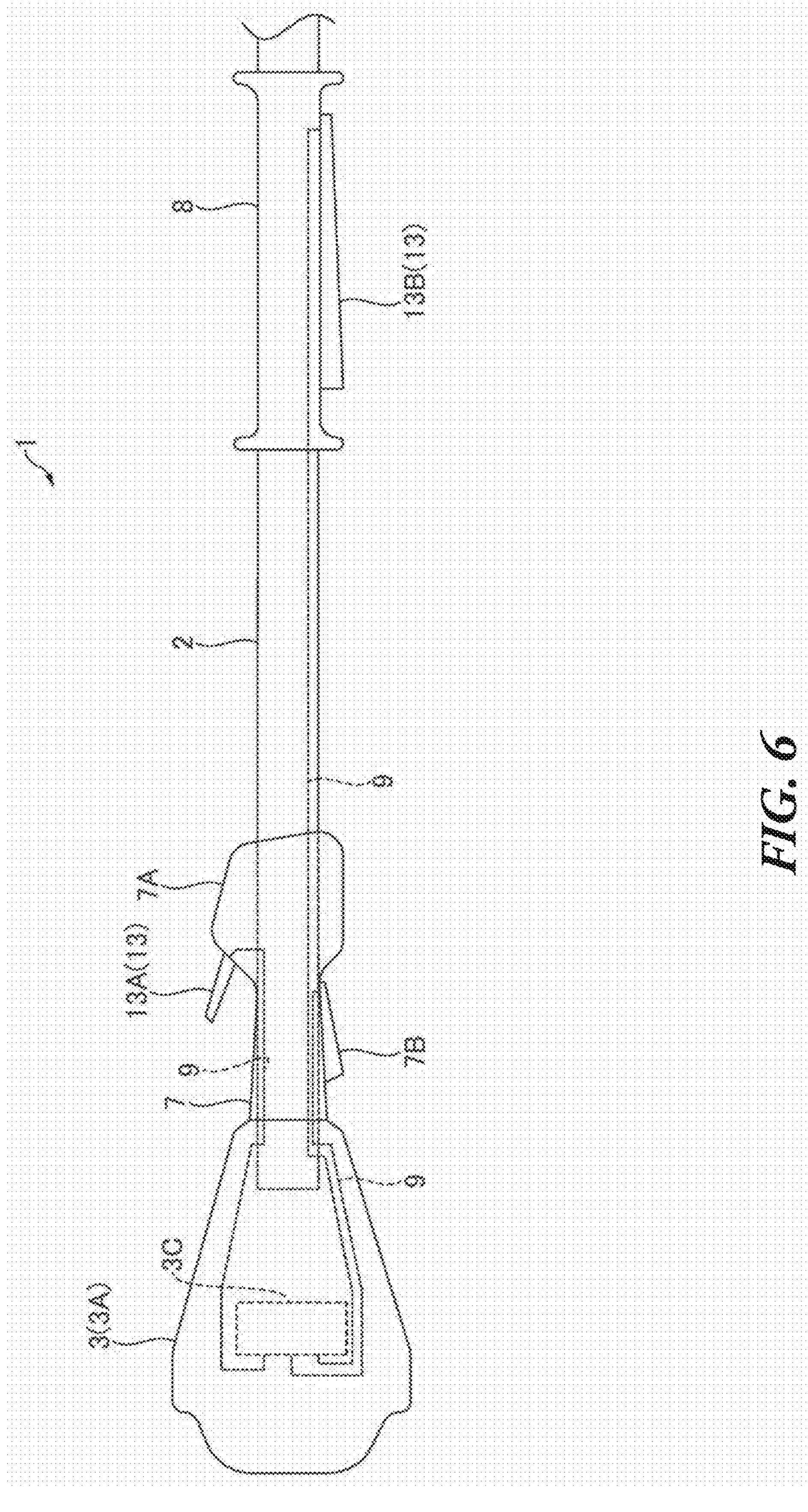
FIG. 6 is a view for illustrating a wiring example of a lead wire in the electric working machine with an operating rod according to an embodiment of the invention.

The position of the detection switch 13, which is for safety measures of the working machine 1, is not limited to the head end of the operating rod 2. As illustrated in FIG. 6, the detection switches 13 (13A and 13B) may be provided on the rear handle 7 and the front handle 8: the detection switch 13A is on the rear handle 7, and the detection switch 13B is on the front handle 8. In this case, the electric motor (not shown) is driven by the controller 3C when a worker operates both the detection switches 13A and 13B at the same time. By this means, the working device 4 is actuated when the worker correctly grips the rear handle 7 and the front handle 8 with both hands; and therefore, the worker can avoid a dangerous operation such as one-handed operation. Also, the working machine 1 may have a plurality of detection switches. The electric motor 3B is driven by the controller 3C when all detection switches detect safety in this case. By this means, the working machine 1 can implement the safety measures reliably.

For providing the detection switches 13 (13A and 13B) on the rear handle 7 and the front handle 8, the detection switch 13A and the detection switch 13B are disposed on the outside of the operating rod 2 as illustrated in FIG. 6. One end of the lead wire 9 connecting the detection switch 13A to the controller 3C is pulled out from the pull-out hole provided near the rear handle 7 on the operating rod 2. Then, this end of the lead wire 9 is connected to the detection switch 13A. Meanwhile, one end of the lead wire 9 connecting the detection switch 13B to the controller 3C is pulled out from the pull-out hole provided near the front handle 8 on the operating rod 2. Then, this end of the lead wire 9 is connected to the detection switch 13B. The other end of each lead wire 9 passing through the inside of the operating rod 2 is pulled out from a pull-out hole on the base end of the operating rod 2. Then, these other ends are connected to the controller 3C of the power device 3.

According to the working machine 1, the power from the electric motor 3B provided on the base end of the operating rod 2 is transmitted to the working device 4 provided on the head end of the operating rod 2 via the power transmission shaft 5 that passes through the inside of the operating rod 2. By this means, the head end weight of the operating rod 2 can be reduced despite an electric working machine. Therefore, the working machine 1 can reduce the load of the operation that moves the head end of the operating rod 2 from side to side, such as in mowing work.

According to the working machine 1, the working device 4 is pivotally supported on the head end of the operating rod 2 to be able to take the storage posture in which the blade member 4A folds along the operating rod 2. The detection switch 13 is provided on the head end of the operating rod 2 to detect the storage posture; the controller 3C is provided on the base end of the operating rod 2 to control the operation of the electric motor 3B. The lead wire 9 is laid in the operating rod 2 to transmit the detection signal from the detection switch 13 to the controller 3C. The controller 3C prevents the electric motor 3B from being driven when the detection switch 13 detects the storage posture of the working device 4. By this means, the working machine 1 can implement the safety measures when the working device 4 is in the storage posture; and therefore, it can prevent the blade member 4A of the working device 4 from being actuated by incorrect operation in the storage posture.

To be more specific, the working device 4 includes a switch operating mechanism. This switch operating mechanism is configured to operate the detection switch 13 when the working device 4 is rotated around the shaft O and folded within the preset angle range. Switch operation of the switch operating mechanism is performed by an operating member 4F configured to rotate together with the working device 4 or a part of the working device 4. The working device 4 can rotate to take the storage posture without affecting the wiring of the lead wire 9, which is connected to the detection switch 13, by fixing the detection switch 13 to the head end of the operating rod 2. In addition, the detection switch 13 is operated by the member rotating together with the working device 4, and therefore it can detect the storage posture of the working device by a simple configuration.

The detection switch 13 is attached to the outside of the fixed gearcase 2A provided on the head end of the operating rod 2. The connecting terminal 11 of the lead wire 9 is pulled out from the operating rod 2 and connected to the detection switch 13. By this means, the detection switch 13 can be provided without affecting the components in the fixed gearcase 2A and connected to the lead wire 9 laid in the operating rod 2. A cover member is provided on the outside of the head end of the operating rod 2 to cover the detection switch 13 in this case. Therefore, the detection switch 13 can avoid troubles such as being broken or disconnected from the lead wire 9 due to grass touching during operation.

According to the invention having the above-described features, an electric working machine with an operating rod can easily implement the safety measures that electrically detect the posture of the working device provided on the head end of the operating rod. This electric working machine is configured to transmit power from an electric motor provided on the base end of the operating rod to the working device via a power transmission shaft passing through the inside of the operating rod.

As described above, the embodiments of the present invention have been described in detail with reference to the drawings. However, the specific configuration is not limited to the embodiments, and the design can be changed without departing from the scope of the present invention. In addition, the above-described embodiments can be combined by utilizing each other's technology as long as there is no particular contradiction or problem in the purpose and configuration.

The invention claimed is:

1. An electric working machine with an operating rod comprising:

an electric motor provided on a base end of the operating rod;

a working device provided on a head end of the operating rod; and a power transmission shaft passing through an inside of the operating rod and configured to transmit power from the electric motor to the working device, wherein:

the working device includes a blade member and is pivotally supported on the head end of the operating rod to be able to take a storage posture in which the blade member folds along the operating rod;

a first detection switch is provided on the head end of the operating rod to detect the storage posture;

a controller is provided on the base end of the operating rod to control the operation of the electric motor;

a lead wire is provided in the operating rod to transmit a detection signal from the first detection switch to the controller;

the controller includes a processor configured to prevent the electric motor from being driven when the first detection switch detects the storage posture of the working device;

at least one additional detection switch is provided in addition to the first detection switch to detect the storage posture; and the processor permits the electric motor to drive when the first and at least one additional detection switch all detect that the electric working machine is safe to operate.

2. The electric working machine with an operating rod according to claim 1, wherein the first detection switch is operated when the working device is rotated around a shaft and folded within a preset angle range.

3. The electric working machine with an operating rod according to claim 2, a further comprising an operating member configured to rotate together with the working device or a part of the working device to operate the first detection switch.

4. The electric working machine with an operating rod according to claim 2, wherein the first detection switch is a proximity sensor, and further comprising an operating member configured to rotate together with the working device or a part of the working device and to operate the first detection switch when the operating member approaches the first detection switch.

5. The electric working machine with an operating rod according to claim 1, wherein the first detection switch is attached to an outside of a fixed gearcase provided on the head end of the operating rod, and a connecting terminal of the lead wire is pulled out from the operating rod and connected to the first detection switch.

6. The electric working machine with an operating rod according to claim 1, wherein a cover member is provided on an outside of the head end of the operating rod to cover the first detection switch.

* * * * *